United States Patent
Tanner et al.

(10) Patent No.: US 10,033,942 B1
(45) Date of Patent: Jul. 24, 2018

(54) REAL TIME VIDEO SYSTEM WITH HIGH DYNAMIC RANGE

(71) Applicant: Altia Systems, Inc., Cupertino, CA (US)

(72) Inventors: Jason Daniel Tanner, Folsom, CA (US); Atif Matin Sarwari, Saratoga, CA (US)

(73) Assignee: Altia Systems, Inc., Cupertino, CA (US)

( * ) Notice: Subject to any disclaimer, the term of this patent is extended or adjusted under 35 U.S.C. 154(b) by 0 days.

(21) Appl. No.: 13/902,764

(22) Filed: May 24, 2013

Related U.S. Application Data

(60) Provisional application No. 61/652,060, filed on May 25, 2012.

(51) Int. Cl.
   *H04N 5/265* (2006.01)

(52) U.S. Cl.
   CPC .................................. *H04N 5/265* (2013.01)

(58) Field of Classification Search
   CPC .... H04N 5/265; H04N 5/355; H04N 5/35536; H04N 5/35554; H04N 5/35572; H04N 5/35581
   See application file for complete search history.

(56) References Cited

U.S. PATENT DOCUMENTS

| | | | | |
|---|---|---|---|---|
| 6,008,486 A | * | 12/1999 | Stam | H04N 5/23258 |
| | | | | 250/208.1 |
| 6,018,565 A | * | 1/2000 | Ergun et al. | 378/95 |
| 6,115,065 A | * | 9/2000 | Yadid-Pecht | H04N 5/235 |
| | | | | 348/308 |
| 6,947,077 B1 | * | 9/2005 | Krymski | H03K 21/38 |
| | | | | 348/221.1 |
| 7,296,286 B2 | * | 11/2007 | Osawa | 725/105 |
| 8,031,258 B2 | * | 10/2011 | Enge | H04N 5/232 |
| | | | | 348/221.1 |
| 2005/0151866 A1 | * | 7/2005 | Ando | H04N 5/2355 |
| | | | | 348/297 |
| 2007/0097254 A1 | * | 5/2007 | Battles | H04N 5/23293 |
| | | | | 348/364 |
| 2008/0043128 A1 | * | 2/2008 | Poonnen | H03M 1/123 |
| | | | | 348/294 |
| 2009/0153699 A1 | * | 6/2009 | Satoh et al. | 348/229.1 |
| 2010/0147947 A1 | * | 6/2010 | Aker et al. | 235/454 |
| 2011/0211732 A1 | * | 9/2011 | Rapaport | 382/107 |

* cited by examiner

*Primary Examiner* — Luong T Nguyen
(74) *Attorney, Agent, or Firm* — HM Law Group LLP; Vani Moodley, Esq.

(57) ABSTRACT

Embodiments of the invention disclose a video imaging system. The system comprises a mechanism to operate in a first capture mode capture a first image sequence comprising images taken at a first exposure and at a first frame rate; a mechanism to perform a detecting operation to detect clipping in said first image sequence a mechanism to selectively switch to operating the video imaging system in a second capture mode to capture at least one additional image sequence comprising images taken at a different exposure, if clipping is detected; and a mechanism to perform a merging operation to merge the image sequences to produce high-dynamic range video.

17 Claims, 4 Drawing Sheets

REAL TIME VIDEO SYSTEM WITH HIGH DYNAMIC RANGE

This application claims the benefit of priority to U.S. Provisional Patent Application No. 61/652,060, which was filed on May 25, 2012, the entire specification of which is incorporated herein by reference.

FIELD

Embodiments of the invention relate generally to video imaging systems and methods.

BACKGROUND

In an image captured by an imaging device there is a limited range of bright and dark information that can be captured. The difference between the brightest detail and the darkest detail that can be captured by an imager without clipping is known as the dynamic range of light. Digital cameras have a much more limited ability to capture the dynamic range compared to the human eye (the human eyes can see ~24 stops of light compared to ~10 for a digital SLR and ~6 for a point and shoot camera).

Video imaging systems may make a tradeoff between showing the brightest, darkest, or mid range details when selecting the exposure for a scene with high dynamic range. If an exposure is set for bright details then shadows are clipped and vice versa.

High-end sensors can improve the dynamic range of a video imaging system, but only by a small amount (e.g. the difference in sensor quality between a point and shoot camera and a dSLR camera might only double the dynamic range).

To a limited extent, it is possible to improve dynamic range of a sensor by lowering its resolution.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Embodiments of the invention disclose a video imaging system. The system comprises a mechanism to operate in a first capture mode capture a first image sequence comprising images taken at a first exposure and at a first frame rate; a mechanism to perform a detecting operation to detect clipping in said first image sequence a mechanism to selectively switch to operating the video imaging system in a second capture mode to capture at least one additional image sequence comprising images taken at a different exposure, if clipping is detected; and a mechanism to perform a merging operation to merge the image sequences to produce high-dynamic range video.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a production technique to produce high dynamic range video images without sacrificing image resolution, or requiring a special high-dynamic range sensor. Embodiments of the invention also disclose a video imaging system that implements said technique to produce high dynamic range video images.

Figure 1:
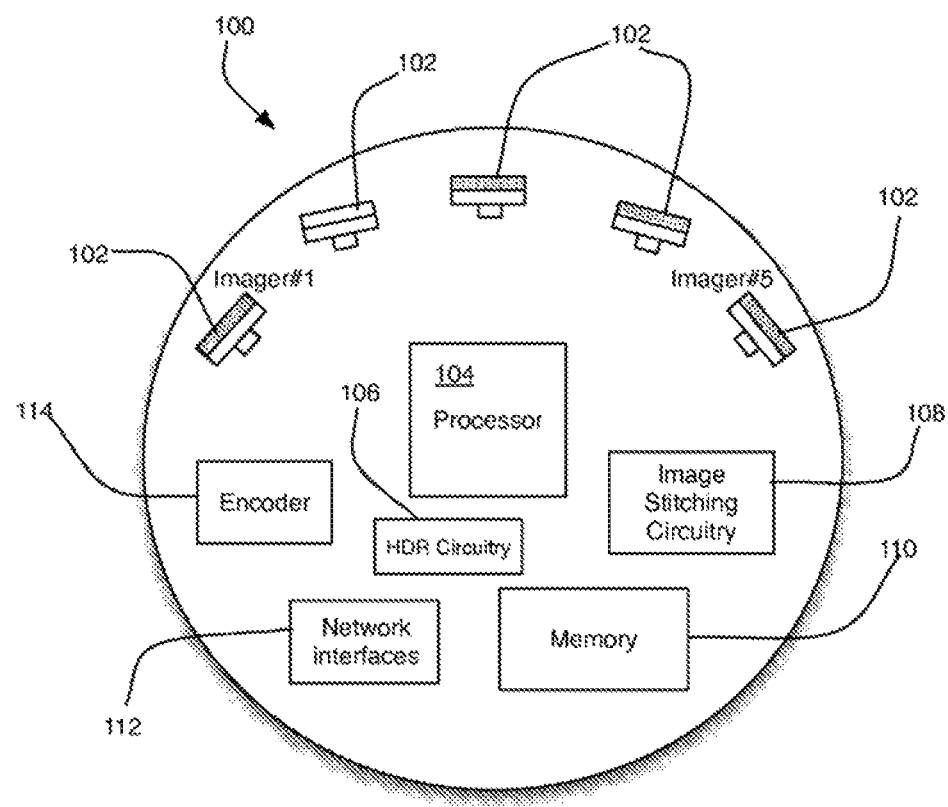
FIG. 1 illustrates a video imaging system, in accordance with one embodiment of the invention.

FIG. 1 illustrates an example embodiment of a video imaging system 100 capable of produce high dynamic range video images according to the production technique disclosed herein. The system 100 includes multiple imagers/sensors 102 mounted along an arc such that each imager 102 is directed to capture a portion of a scene. Each imager 102 may include suitable sensors, for example charge-coupled device (CCD) or complimentary metal-oxide semiconductor (CMOS) imaging sensors, as is known in the art. In one embodiment (not shown) the system 100 may include only a single imager 102.

The system 100 may include logic/processor 104, high dynamic range (HDR) circuitry 106, image stitching circuitry 108, memory 110, one or more network interfaces 112, and an encoder 114. In one embodiment, digital signals recorded by sensors 102 are sent to the logic/processor 104 for processing. In one embodiment, the logic/processor 104 may execute programs for implementing image processing functions and calibration functions, as well as for controlling the operation of the entire device 100 including its image capture operations. Optionally, the logic/processor 104 may include signal processing functionality for performing image processing including image filtering and enhancement. Said image processing may include HDR image production with the HDR circuitry 106 (as will be described later), and image stitching or blending with the image stitching circuitry 108. Although shown separately, in some embodiments, the circuitry 106, and 108 may exist as part of the logic/processor 104. It is to be understood that components of the device 100 may take the form of hardware, software, firmware, or any combination of hardware, software, and firmware.

Digital signals representing images may be stored in memory 110. The encoder 114 may compress digital signals before transmission via a network interface 112. The network interfaces 112 may be configured to provide network connectivity to the device 100. As such, the network interfaces 112 may include wireless and wired interfaces, in accordance with different embodiments.

In one embodiment, the production technique begins with a detection operation to determine if a significant portion of a scene being imaged or captured requires high dynamic range. The detection operation may be achieved by determining if the number and grouping of pixels (i.e. dark or light areas) that are clipped are greater than a clipping threshold sufficient to indicate that high dynamic range is needed. In one embodiment, pixels in both dark/shadow and bright/highlight regions of an image for the scene are checked for clipping. For example, for a video imaging system with a 640×480 resolution and 300 k pixels, a threshold set at 10% would require 30 k clipped pixels (in dark regions and/or bright regions) as an indication that high dynamic range is needed.

For illustrative purposes, assume that video imaging system similar to the system 100, but with only a single imager (although the techniques disclosed herein are equally applicable to multiple imager video imaging systems) running at 60 fps (hereinafter the "system frame rate") with an exposure or integration time of 1/100 (hereinafter the "system exposure").

Figure 2:
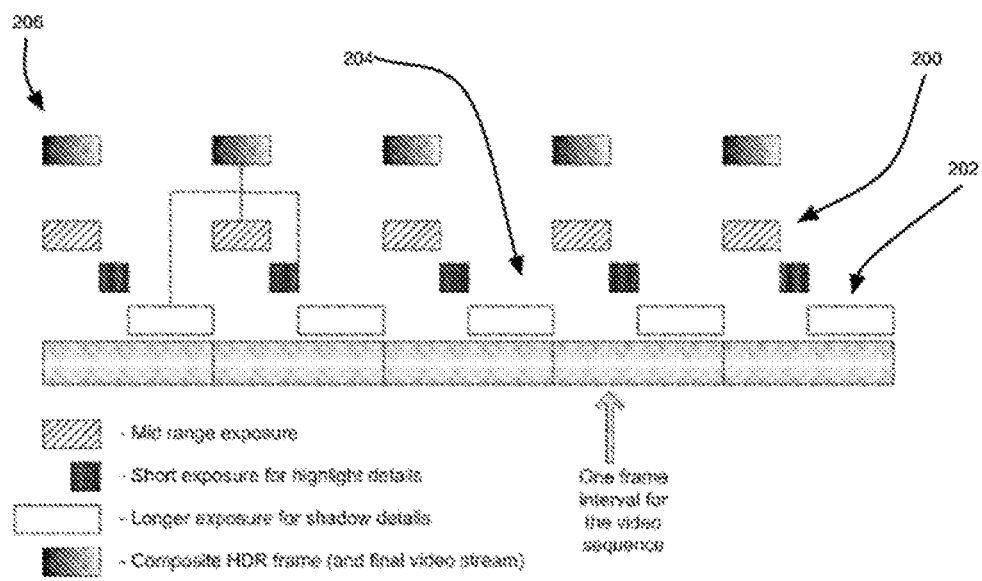
FIG. 2 illustrates a video imaging system, in accordance with one embodiment of the invention.

In one embodiment, the system 100 may be configured to capture different exposures in a repeating pattern, as is illustrated in FIG. 2. Referring to FIG. 2, reference numeral 200 indicates a first image sequence that may be captured at a mid range exposure (also referred to herein as "normal exposure"). If shadows are clipped at higher than the clipping threshold for dark areas then the system 100 may capture a second image sequence 202 at a longer exposure. Likewise, if bright areas are being clipped at higher than the threshold for bright areas, then the system may capture a third image sequence 204 at a short exposure. In one embodiment, the frames of different exposure are interpolated to the same time and used to create high dynamic range (HDR) composite/integrated video images 206. There are several known techniques for creating an HDR composite from multiple frames, as will be known to one of ordinary skill in the art. Any of these techniques may be used to produce the HDR composite.

For example, if shadows are being clipped, every other frame may be captured at a slower integration time (longer exposure), say 1/50 to capture more details in the shadows, thereby to define the lower-speed or longer exposure image sequence 202. The regular or mid-range exposure sequence 200 may have an exposure of 1/100. Integrating or combining the video sequences 200 and 202 would lead to a lower effective integration time and a consequential lowering of the overall frame rate (down to 33 fps, in this case). In one embodiment, to improve the frame rate while maintaining the slower integration time of 1/50, the lower-speed exposure image sequence 202 may be paired with a faster integration time (shorter exposure time) image sequence. For instance, an image sequence with an integration time of 1/300 (3 ms) may be integrated with the 1/50 image sequence to improve the overall/effective frame rate to 43 fps (1/23 ms).

Similarly, if too many details are being blown out, a higher speed exposure may be taken (e.g. 1/200), thereby to define a higher-speed exposure image sequence 204. Thus, there will be two exposures at 1/100 and 1/200 that may be combined to produce composite video images at an effective frame rate of 66 fps.

If a scene has very high dynamic range, three or more exposures may be taken and subsequently integrated, in one embodiment. For example, one exposure may be at 1/50, one at 1/100, and one at 1/200 to produce composite video images at an effective frame rate of 28 fps.

In one embodiment, a frame rate conversion (FRC) technique may be performed in order to maintain the system frame rate (thereby avoiding a lower frame rate) for the composite or integrated video image stream 206. For a composite/integrated video stream running at the system frame rate of 60 fps, a lower exposure (e.g. 1/50) video sequence and a higher exposure video sequence may be combined with a system exposure (1/100) video sequence as follows. For each frame N of the system exposure video taken at time T, motion correction or interpolation is performed on adjacent frames of first exposure sequence that straddle the frame N in time to obtain a temporal frame, N(Low) at the first exposure that corresponds with the time T. Likewise, interpolation may be performed on frames of the higher exposure video sequence to obtain a frame, N(High) at the higher exposure that corresponds with the time T. The frames N, N(Low), and N(High) may then be integrated to produce a composite HDR video stream at the system frame rate of 60 fps.

Thus, for the FRC technique described above, each image of the 1/100 sequence taken at time T, would be integrated with an image from the 1/50 sequence derived by interpolation of 1/50 exposures at t−25 ms and t+10 ms. The interpolation corrects for motion. Likewise, for the 1/200 exposure frames at t−5 ms and t+30 ms in the 1/200 exposure sequence are interpolated to derive a 1/200 exposure frame corresponding to time T for purposes of integration as described.

In one embodiment, the additional time value exposures may be time multiplexed to perform the HDR without affecting bandwidth. For example, a main stream at 1/100 may run at 40 fps while for every other frame an image from one of the other two exposures may be captured.

In one embodiment, the maximum exposure for a video capture is set to the following:

max_exposure=1/frame_rate

In the above, there are three frame captures within the period of one final frame. So the effective frame rate is set to frame_rate=1/(mid_exposure+bright_exposure+dark_exposure)

If the video only needs a mid_exposure and a dark_exposure, the effective frame_rate would set the bright_exposure in the equation above to zero and the HDR merge would occur with two frames instead of three.

With the additional exposures, the system 100 may determine if each additional exposure is capturing more details in the scene than before. In the earlier example, a 10% threshold was mentioned to indicate an additional exposure is needed. Thus, out of 300 k pixels, 30 k need to be too bright or too dark. If we assume there have been 40 k too bright, a bright exposure will be captured. When that bright exposure is captured, the number of "too bright" pixels may be measured. If the too bright pixels still number 40 k, the exposure needs to shorten since no additional information relative to the clipped pixels was acquired. A threshold may be set to satisfy the requirement that enough pixels are now being caught with the additional bright exposure.

Figure 3:
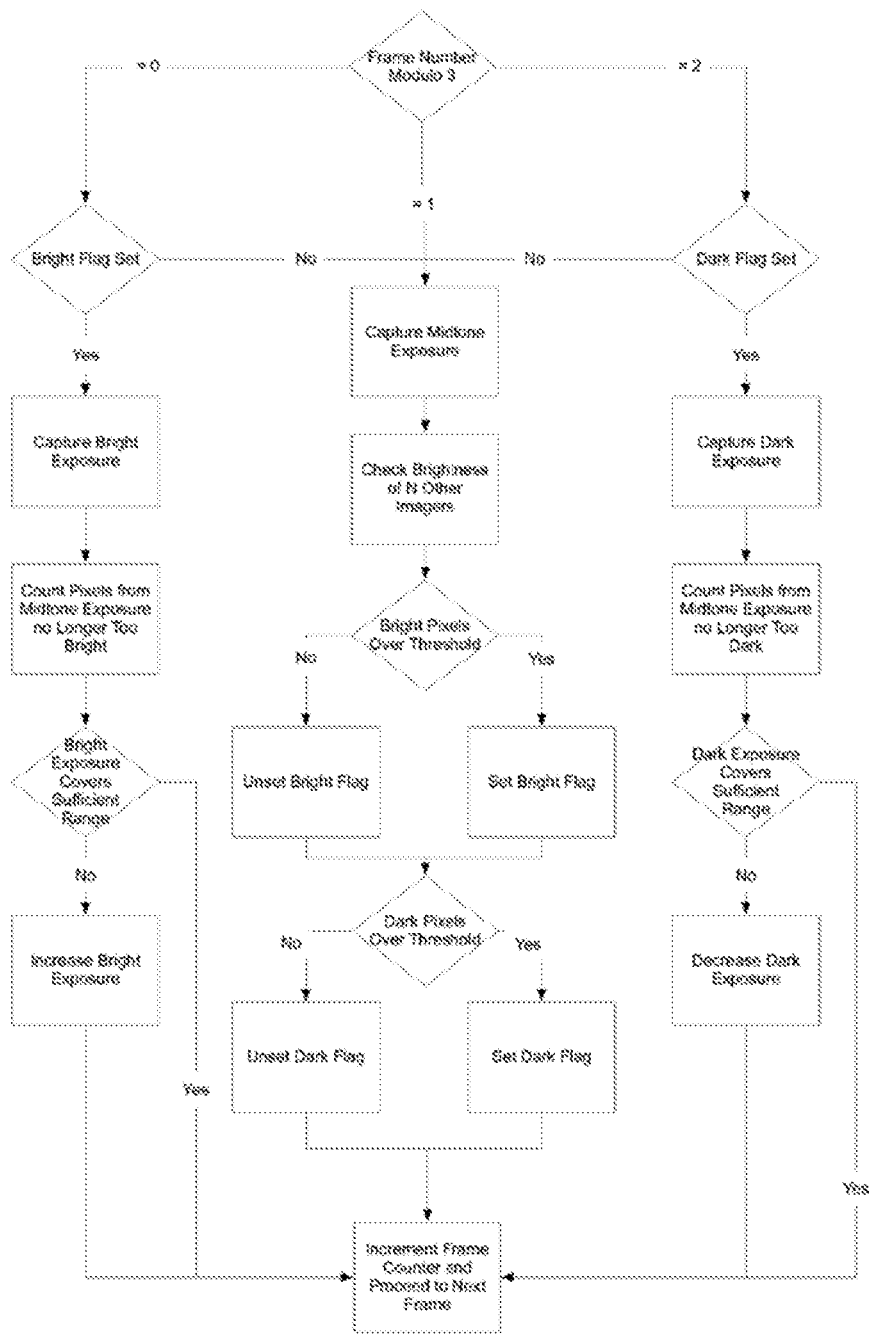
FIG. 3 illustrates a flowchart for enabling HDR, in accordance with one embodiment of the invention.

In one embodiment, enabling and disabling additional exposures to enable HDR may be performed dynamically by flagging said additional exposures as they are needed to improve the dynamic range of the scene, as shown in the flowchart of FIG. 3. If there is sufficient dynamic range in the scene, the video sequence proceeds at the regular or system frame rate. That frame rate would be approximately 3× the frame rate of an HDR video sequence that requires both bright and dark exposures. The system 100 determines based on the HDR thresholds to optimize between frame rate and dynamic range on the fly. To minimize the effect when the flag to enable HDR is asserted, the brightness may gradually be increased to provide a smooth transition to higher dynamic range. If the scene changes and the bright and/or dark exposures are no longer needed, these exposures may gradually be phased out, in one embodiment. In one embodiment, regions of bright and/or dark exposure may gradually be adjusted to be the same as the existing midrange exposure over multiple frames. Once it reaches the midrange exposure, the frame is no longer used for an HDR composite. Instead the frame may be used to increase the frame rate.

Figure 4:
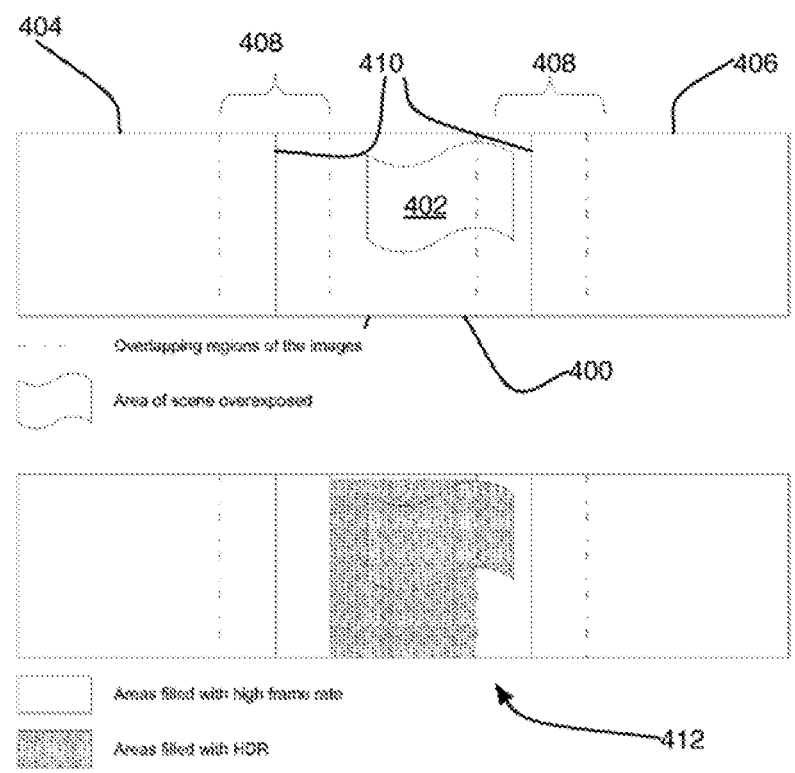
FIG. 4 illustrates image sequences captured using a video imaging system, in accordance with one embodiment of the invention.

In the case of the multiple imager video system 100, the overall stream may be optimized for the content of each imager, in accordance with one embodiment of the invention, where as shown in FIG. 3, each imager 102 may detect if its respective scene has high dynamic range and requires a bright and/or dark exposure. This aspect is illustrated FIG. 4, for a three imager system (although it is to be understood that the technique applies equally well to system with more than three imagers). Referring to FIG. 4, a middle imager 400 captures images at a normal exposure and includes content 402 that is overexposed or clipped. Thus, in accordance with the techniques disclosed herein, the middle imager 400 starts capturing images at a higher exposure and integrated the normal exposure images thereby producing HDR video with a reduced overall frame rate for the imager 400. A left imager 404, and a right imager 406 each maintain a higher or system frame rate for images, as there are no over or under exposed regions in their respectively captured images. Images from the imagers 400, 402, and 404 may be stitched in order to produce panoramic video 412, e.g. in accordance with the techniques disclosed in co-pending U.S. patent application Ser. Nos. 13/902,136, 13/902,186, and 13/902,248, each of which is hereby incorporated herein by reference, in its entirety. For purpose of image stitching, reference numeral 408 indicate regions of overlap in the images, and reference numeral 410 indicates merge lines. In one embodiment, for image stitching, pixels are selected from the composite HDR image for the overexposed pixels, whereas pixels from the higher frame rate images are used for normal exposure regions.

In one embodiment, to maintain a video without the visual artifact of having the middle imager at a different frame rate, the system can insert a duplicate frame, interpolate the missing frame through frame rate conversion, or make an HDR composite at every frame alternating between the midtone and bright exposures. To avoid stutter in the video, the alternate frame would need to be interpolated to the same cadence as the other system frame rate. So if the high frame rate images are taken every 16 ms to achieve 60 fps with a shutter speed of 1/100, they take an image at t, t+16 ms, t+32 ms, etc. In this example, the high dynamic range sequence is captured using 1/100 and 1/50. The images would be captured at t, t+10, t+32, t+42, t+64 with the alternate frames being the different exposure times. The 1/100 exposure lines up in time with the other two exposures although at a lower frame rate (t, t+32, t+64). If the 1/50 exposure is used to maintain frame rate, it would be interpolated to the corresponding t+16, t+48 to provide smooth/consistent motion in the video.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for a video imaging system comprising:
   operating the video imaging system in a first capture mode to capture a first image sequence comprising images taken at a first integration time and at a first frame rate;
   performing a detecting operation to detect clipping in said first image sequence;
   selectively switching the video imaging system to operate in a second capture mode to capture at least two additional image sequences comprising a second image sequence and a third image sequence taken at different integration times in case the clipping is detected in the detection operation; and
   performing a merging operation to merge the first image sequence and each additional image sequence to produce high-dynamic range video.

2. The method of claim 1, wherein the detection of clipping is based on a clipping threshold set in respect of dark and light areas for images.

3. The method of claim 1, wherein images of the second image sequence are at a second integration time that is longer than the first integration time.

4. The method of claim 1, wherein images of the third image sequence are at a third integration time that is shorter than the first integration time.

5. The method of claim 4, wherein the merging operation comprises determining matching images in the second and third image sequences that are temporally aligned with each image in the first image sequence.

6. The method of claim 4, wherein the merging operation comprises integrating the each image in the first image sequence with matching images in the second and third images to produce the high-dynamic range video.

7. The method of claim 6, further comprising selectively switching back to the first capture mode if the clipping is no longer detected.

8. A video imaging system, comprising:
   one or more processors configured to:
   operate the video imaging system in a first capture mode to capture a first image sequence comprising images taken at a first integration time and at a first frame rate;
   detect clipping in said first image sequence;
   selectively switch the video imaging system to operate in a second capture mode to capture at least two additional image sequences comprising a second image sequence and a third image sequence taken at different integration times in case the clipping is detected in the detection operation; and
   perform a merging operation to merge the first image sequence and each additional image sequence to produce high-dynamic range video.

9. The system of claim 8, wherein detecting the clipping is based on a clipping threshold set in respect of dark and light areas for images.

10. The system of claim 8, wherein images of the second image sequence are at a second integration time that is longer than the first integration time.

11. The system of claim 8, wherein images of the third image sequence are at a third integration time that is shorter than the first integration time.

12. The system of claim 11, wherein the merging operation comprises determining matching images in the second and third image sequences that are temporally aligned with each image in the first image sequence.

13. The system of claim 12, wherein the merging operation comprises integrating the each image in the first image sequence with said matching images in the second and third images to produce the high-dynamic range video.

14. The system of claim 13, further comprising a component to selectively switch back to the first capture mode if the clipping is no longer detected.

15. A non-transitory computer-readable medium having stored thereon a sequence of instructions which when executed by a system causes the system to perform a method for producing video images, said method, comprising:

operating a video imaging system in a first capture mode to capture a first image sequence comprising images taken at a first integration time and at a first frame rate;

performing a detecting operation to detect clipping in said first image sequence; selectively switching the video imaging system to operate in a second capture mode to capture at least two additional image sequences comprising a second image sequence and a third image sequence taken at different integration times in case the clipping is detected in the detection operation; and performing a merging operation to merge the first image sequence and each additional image sequence to produce high-dynamic range video.

16. The non-transitory computer-readable medium of claim 15, wherein detecting the clipping is based on a clipping threshold set in respect of dark and light areas for images.

17. The non-transitory computer-readable medium of claim 15, wherein images of the second image sequence are at a second integration time that is longer than the first integration time.

* * * * *